United States Patent
Zhang et al.

(10) Patent No.: US 11,125,322 B2
(45) Date of Patent: Sep. 21, 2021

(54) FLOW VALVE CONTROL METHOD AND APPARATUS, AND STORAGE MEDIUM

(71) Applicant: Great Wall Motor Company Limited, Baoding (CN)

(72) Inventors: Bingyu Zhang, Baoding (CN); Lilin Wei, Baoding (CN); Ouyang Li, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 0 days.

(21) Appl. No.: 16/762,669

(22) PCT Filed: Dec. 26, 2018

(86) PCT No.: PCT/CN2018/123897
§ 371 (c)(1),
(2) Date: May 8, 2020

(87) PCT Pub. No.: WO2019/129058
PCT Pub. Date: Jul. 4, 2019

(65) Prior Publication Data
US 2021/0172514 A1    Jun. 10, 2021

(30) Foreign Application Priority Data
Dec. 26, 2017   (CN) .......................... 201711434760.3

(51) Int. Cl.
*F16H 61/02*  (2006.01)
*F15B 19/00*  (2006.01)
(Continued)

(52) U.S. Cl.
CPC ....... *F16H 61/0204* (2013.01); *F15B 19/002* (2013.01); *F15B 21/087* (2013.01);
(Continued)

(58) Field of Classification Search
CPC ................. F16H 61/0204; F16H 61/30; F16H 2061/0065; F16H 2061/0068;
(Continued)

(56) References Cited

U.S. PATENT DOCUMENTS 8,265,844 B2 * 9/2012 Takei ...................... F16D 48/02
701/68
2003/0187562 A1 * 10/2003 Ishii ...................... F15B 21/087
701/51
(Continued)

FOREIGN PATENT DOCUMENTS

| CN | 101641530 A | 2/2010 |
|----|-------------|--------|
| CN | 102159843 A | 8/2011 |

(Continued)

*Primary Examiner* — Edwin A Young
(74) *Attorney, Agent, or Firm* — Volpe Koenig (57) ABSTRACT

A flow valve control method, apparatus, and storage medium are provided. The method comprises: conducting a median current value teach-in of a flow valve starting from an initial median current value of the flow valve; and correcting a flow-current curve of the flow valve based on a deviation value obtained by the teach-in. Each teach-in process comprises: controlling current output to a flow valve, so that the flow valve successively goes through: when there is a flow passing through, an output flow enables a shifting mechanism to return to position, and when there is a flow passing through again, an output flow again enables the shifting mechanism to return to position; recording a current value the twice when there is a flow passing through the flow valve as a maximum median current value; and acquiring a deviation value of the maximum median current value from the initial median current value.

15 Claims, 3 Drawing Sheets

---

S110 — Controlling a current output to the flow valve, so that the flow valve goes through the following processes successively: a flow passes for the first time, the output flow makes a shifting mechanism return, a flow passes again, and the output flow makes the shifting mechanism return again S120 — Recording current values when the flows pass through the flow valve twice as the maximum median current values S130 — Acquiring a deviation value of each of the maximum mesian current values and the initial median current value (51) Int. Cl.
*F15B 21/08* (2006.01)
*F16H 61/30* (2006.01)
*F16H 61/00* (2006.01)
*F16H 61/28* (2006.01)

(52) U.S. Cl.
CPC ........ *F16H 61/30* (2013.01); *F15B 2211/327* (2013.01); *F15B 2211/6654* (2013.01); *F16H 2061/0065* (2013.01); *F16H 2061/0068* (2013.01); *F16H 2061/0087* (2013.01); *F16H 2061/283* (2013.01)

(58) Field of Classification Search
CPC ....... F16H 2061/0087; F16H 2061/283; F15B 19/002; F15B 21/087; F15B 2211/327; F15B 2211/6654
See application file for complete search history.

(56) References Cited

U.S. PATENT DOCUMENTS

| | | | |
|---|---|---|---|
| 2007/0234340 | A1 | 10/2007 | Strosser et al. |
| 2007/0288148 | A1* | 12/2007 | Cui ..................... F16H 61/0021 701/51 |
| 2012/0109385 | A1* | 5/2012 | Morita .................. F16D 48/066 700/281 |
| 2016/0290523 | A1 | 10/2016 | Kenkel |
| 2017/0146117 | A1* | 5/2017 | Philippart ........... F16H 61/0204 |

FOREIGN PATENT DOCUMENTS

| | | |
|---|---|---|
| CN | 102806905 A | 12/2012 |
| CN | 106481689 A | 3/2017 |
| CN | 106886244 A | 6/2017 |
| JP | 2010156429 A | 7/2010 |

* cited by examiner

FLOW VALVE CONTROL METHOD AND APPARATUS, AND STORAGE MEDIUM

CROSS REFERENCE TO RELATED APPLICATIONS

This application is a 35 USC § 371 national stage of PCT/CN2018/123897, which was filed Dec. 26, 2018, claims priority to Chinese Application No. 201711434760.3, filed on Dec. 26, 2017, and is entitled "FLOW VALVE CONTROL METHOD AND APPARATUS, AND STORAGE MEDIUM," both of which are incorporated herein by reference as if fully set forth.

FIELD OF THE INVENTION

The present invention relates to the field of flow valves and in particular to a flow valve control method and apparatus, and a storage medium.

BACKGROUND OF THE INVENTION

When a shifting fork of a wet double-clutch transmission in the prior art works, gear shifting is realized by pushing shifting forks by virtue of a flow and a pressure controlled by hydraulic valves, wherein a flow valve controls the flow, a pressure valve controls the pressure, and the different hydraulic valves control the different shifting forks to realize gear shifting. Flow control is mainly realized based on a fixed flow-current curve, namely corresponding current values of the flow valve are acquired from the flow-current curve according to demands of the shifting forks for the flow so as to control the opening of the flow valve.

However, the control precision of the flow valve may be affected by assembly and production errors of the hydraulic valves, a shifting fork piston cylinder, shifting fork hardware and the like as well as factors such as different lengths of hydraulic pipelines, different oil drainage rates of the pipelines and durable abrasion, and thus, the fixed flow-current curve of the flow valve cannot meet the demand for the precise control of the flow valve.

More specifically, an existing flow control strategy based on the fixed flow-current curve of the flow valve is incapable of adapting to the variation of the hardware so as to cause the following problem:

firstly, a hydraulic oil filling effect becomes poor, if the flow of hydraulic oil cannot meet an actual requirement, the hydraulic response time may be shortened to result in failure of gear shifting of the shifting forks, and thus, functional requirements cannot be met;

secondly, the applicability of the flow control strategy is lowered;

thirdly, the flow-current curve of the flow valve may be changed after an endurance test, so that the service life of a whole gearbox may be shortened; and fourthly, the difficulty of calibration work is increased, and resources are wasted.

Therefore, a novel flow control strategy for a transmission is required to be proposed to avoid influences of the variation of the hardware on flow control precision.

SUMMARY OF THE INVENTION

For this purpose, the present invention aims at providing a flow valve control method to at least partially solve the above-mentioned technical problems.

For achieving the above-mentioned purpose, a technical solution of the present invention is realized in such a way:

a flow valve control method, comprising:

conducting a median current value teach-in of a flow valve starting from an initial median current value of the flow valve, wherein each process of teach-in comprises:

controlling a current output to the flow valve, so that the flow valve goes through the following processes successively: a flow passes for the first time, the output flow makes a shifting mechanism return, a flow passes again, and the output flow makes the shifting mechanism return again;

recording current values when the flows pass through the flow valve twice as the maximum median current values; and acquiring a deviation value of each of the maximum median current values and the initial median current value; and correcting a flow-current curve of the flow valve based on the deviation value;

wherein an initial median current value in a first tech-in process is an default median current value, and an initial median current value in a next teach-in process is a corresponding median current value of the flow valve in the flow-current curve obtained by correction in a previous teach-in process.

Further, the step of controlling a current output to the flow valve comprises: increasing the current output to the flow valve at a first preset speed until a flow passes for the first time, and recording a current value when the flow passes for the first time as the maximum median current value of a high side; reducing the current output to the flow valve at a second preset speed until the flow output by the flow valve makes the shifting mechanism return; reducing the current output to the flow valve at a third preset speed until a flow passes again, and recording a current value when the flow passes again as the maximum median current value of a low side; and increasing the current output to the flow valve at a fourth preset speed until the flow output by the flow valve makes the shifting mechanism return again.

Further, the step of controlling a current output to the flow valve comprises: reducing the current output to the flow valve at a first preset speed until a flow passes for the first time, and recording a current value when the flow passes for the first time as the maximum median current value of the low side; increasing the current output to the flow valve at a second preset speed until the flow output by the flow valve makes the shifting mechanism return; increasing the current output to the flow valve at a third preset speed until a flow passes again, and recording a current value when the flow passes again as the maximum median current value of the high side; and reducing the current output to the flow valve at a fourth preset speed until the flow output by the flow valve makes the shifting mechanism return again.

Further, whether a flow passes through the flow valve is judged by using following methods: judging that the flow passes through the flow valve when a difference between the current position value and an initial median value of the shifting mechanism is greater than a first preset position threshold and the current position value of the shifting mechanism is greater than a second preset position threshold; and/or judging that the flow passes through the flow valve when a movement speed of the shifting mechanism is greater than a preset speed threshold.

Further, the method further comprising: ending the teach-in process when any one of the following conditions is not met:

vehicle driving conditions are kept stable in the teach-in process;

the initial median value of the shifting mechanism does not exceed a third preset position threshold;

before the flow passes through the flow valve, the time of increasing or reducing for a current of the flow valve does not exceed a first preset time threshold;

the time of returning the shifting mechanism does not exceed a second preset time threshold; and a deviation between the maximum median current value of the high side and the maximum current value of the low side cannot exceed a preset current deviation threshold.

Compared with the prior art, the flow valve control method provided by the present invention has the following advantages: according to the flow valve control method provided by an embodiment of the present invention, a precise current-flow curve is obtained by continuously correcting the median current value of the flow valve based on a teach-in control strategy, the variation of the median current value, caused by the variation of the hardware, is avoided, and the flow valve control method is high in applicability and capable of achieving the aim of precisely controlling the flow valve, so that the hydraulic oil filling effect as well as the gear shifting smoothness and time may be guaranteed, and the service life of the whole gearbox of the transmission may be favorably prolonged.

The other purpose of the present invention is to provide a flow valve control apparatus to at least partially solve the above-mentioned technical problems.

For achieving the above-mentioned purpose, a technical solution of the present invention is realized in such a way:

a flow valve control apparatus, comprising:

a teach-in module, used for conducting a median current value teach-in of a flow valve starting from an initial median current value of the flow valve, wherein each process of self-learning comprises:

controlling a current output to the flow valve, so that the flow valve goes through the following processes successively: a flow passes for the first time, the output flow makes a shifting mechanism return, a flow passes again, and the output flow makes the shifting mechanism return again;

recording current values when the flows pass through the flow valve twice as the maximum median current values; and acquiring a deviation value of each of the maximum median current values and the initial median current value; and a correction module, used for correcting a flow-current curve of the flow valve based on the deviation value, wherein an initial median current value in a first teach-in process is an default median current value, and an initial median current value in a next teach-in process is a corresponding median current value of the flow valve in the flow-current curve obtained by correction in a previous self-learning process.

Further, the teach-in module is used for controlling a current output to the flow valve in the teach-in process comprises: increasing the current output to the flow valve at a first preset speed until a flow passes for the first time, and recording a current value when the flow passes for the first time as the maximum median current value of a high side; reducing the current output to the flow valve at a second preset speed until the flow output by the flow valve makes the shifting mechanism return; reducing the current output to the flow valve at a third preset speed until a flow passes again, and recording a current value when the flow passes again as the maximum median current value of a low side; and increasing the current output to the flow valve at a fourth preset speed until the flow output by the flow valve makes the shifting mechanism return again.

Further, the teach-in module is used for controlling a current output to the flow valve in the teach-in process comprises: reducing the current output to the flow valve at the first preset speed until a flow passes for the first time, and recording a current value when the flow passes for the first time as the maximum median current value of the low side; increasing the current output to the flow valve at a second preset speed until the flow output by the flow valve makes the shifting mechanism return; increasing the current output to the flow valve at a third preset speed until a flow passes again, and recording a current value when the flow passes again as the maximum median current value of the high side; and reducing the current output to the flow valve at a fourth preset speed until the flow output by the flow valve makes the shifting mechanism return again.

Further, the teach-in module comprises a judging sub-module which is used for judging whether a flow passes through the flow valve by using following methods: judging that the flow passes through the flow valve when a difference between the current position value and an initial median value of the shifting mechanism is greater than a first preset position threshold and the current position value of the shifting mechanism is greater than a second preset position threshold; and/or; judging that the flow passes through the flow valve when a movement speed of the shifting mechanism is greater than a preset speed threshold.

Further, the apparatus further comprising a diagnosis module which is used for diagnosing the following conditions in the teach-in process and ending the teach-in process when any one of the following conditions is not met:

vehicle driving conditions are kept stable in the teach-in process;

the initial median value of the shifting mechanism does not exceed a third preset position threshold;

before the flow passes through the flow valve, the time of increasing or reducing for a current of the flow valve does not exceed a first preset time threshold;

the time of returning the shifting mechanism does not exceed a second preset time threshold; and a deviation between the maximum median current value of the high side and the maximum current value of the low side cannot exceed a preset current deviation threshold.

A technical solution of the present invention further provides a computer readable storage medium storing a computer program, wherein the above-mentioned flow valve control method is implemented when the program is executed by a processor.

The flow valve control apparatus and the above-mentioned flow valve control method have the same advantages as those in the prior art, the descriptions thereof are omitted herein.

Other characteristics and advantages of the present invention will be described in detail in the following detailed description part.

BRIEF DESCRIPTION OF DRAWINGS

The accompanying drawings constituting one part of the present invention are provided for further understanding of the present invention, schematic descriptions of the present invention and explanations thereof are intended to explain the present invention, rather than to construct improper limitations to the present invention. In the accompanying drawings.

DESCRIPTION OF NUMERALS IN THE ACCOMPANYING DRAWINGS 410, teach-in module 420, correction module
411, judging sub-module 430, diagnosis module

DETAILED DESCRIPTION OF THE EMBODIMENTS

It should be explained that descriptions in the present invention and features in the descriptions may be combined with each other without conflicts.

The present invention will be described in detail below by referring to accompanying drawings in combination with the descriptions.

In a process of implementing this application, the inventor of this application finds that: in a solution of controlling a flow valve by virtue of a flow-current curve, a key point of judging whether the flow-current curve is precise or not lies in a critical point of a median current of the flow valve on the curve, namely a critical point where a flow passes through the flow valve (a current value corresponding to the point is called a median current value on the curve below), and the point affects the hydraulic oil filling effect as well as the smoothness and gear shifting time of a shifting mechanism.

Therefore, a main inventive concept of embodiments of the present invention is that the flow-current curve is corrected based on the correction of the critical point of the median current of the above-mentioned flow valve so as to adapt to influences of variation of hardware on control precision of the flow valve.

Figure 1:
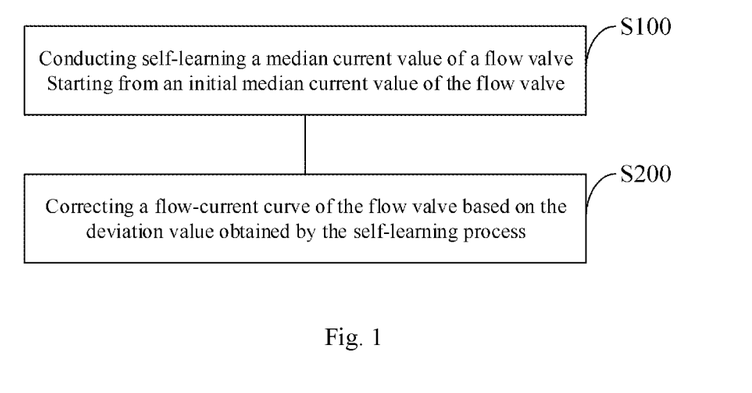
FIG. 1 is a schematic diagram of a flow valve control method in an embodiment of the present invention.

FIG. 1 is a schematic diagram of a flow valve control method in an embodiment of the present invention. In the embodiment of the present invention, the flow valve control method is applied to a transmission, and the transmission is preferably an automatic transmission in a vehicle and is particularly a wet double-clutch automatic transmission. However, it should be understood that the flow valve control method in the embodiment of the present invention can also be applied to teach-in of other functional flow valves.

As shown in FIG. 1, the flow valve control method can comprise the following steps:

step S100, conducting a median current value teach-in of a flow valve starting from an initial median current value of the flow valve.

For the wet double-clutch automatic transmission, in order to guarantee a teach-in effect, several working condition requirements and a shifting mechanism may be proposed as follows:

1) a road condition is good, and a vehicle straight runs at a constant speed;

2) only one gear is in-place, no gears on the other input shaft are in-place, the input shaft is in an idling state, and a dragging torque of a driven clutch cannot be overhigh;

3) the oil temperature of the transmission is within a reasonable range such as 20-80 DEG C.;

4) the pressure of a clutch on a neutral gear shaft approaches 0 bar;

5) the shifting mechanism such as a shifting fork requires a shifting fork position sensor signal to be valid and the shifting fork to be on a neutral gear position (namely approaching 0 mm); and 6) a gear shift failure record cannot appear in the driving cycle.

A teach-in process may be started under the condition that these requirements on the cycles and the shifting mechanism are met.

Figure 2:
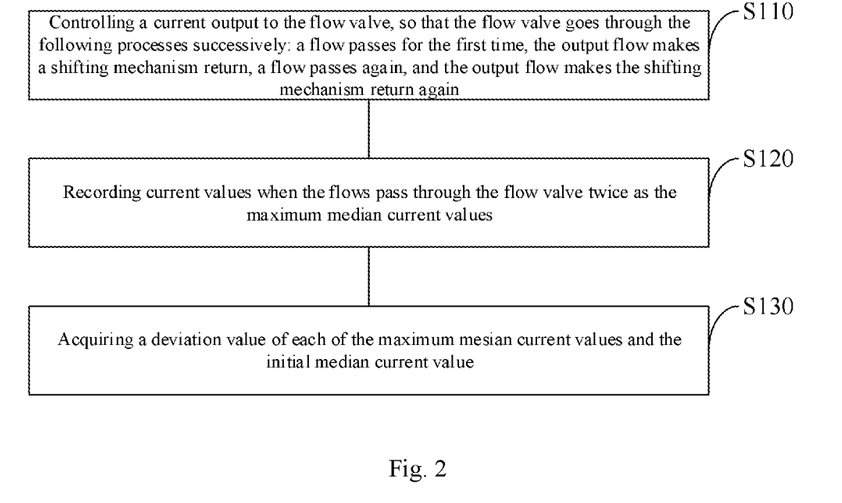
FIG. 2 is a schematic flow diagram of a teach-in process in an embodiment of the present invention.

FIG. 2 is a schematic flow diagram of a teach-in process in an embodiment of the present invention. As shown in FIG. 2, each process of teach-in in step S100 can comprise the following steps:

step S110, controlling a current output to the flow valve, so that the flow valve goes through the following processes successively: a flow passes for the first time, the output flow makes a shifting mechanism return, a flow passes again, and the output flow makes the shifting mechanism return again.

Step S120, recording current values when the flows pass through the flow valve twice as the maximum median current values.

Step S130, acquiring a deviation value of each of the maximum median current values and the initial median current value.

An initial median current value in the first teach-in process is an default median current value, and an initial median current value in a next teach-in process is a corresponding median current value of the flow valve in the flow-current curve obtained by correction in a previous teach-in process. When the initial median current value in the first teach-in process is the default median current value, the flow valve is located on an absolute median, no flows passes, and the shifting mechanism is located on the median.

In a preferred embodiment, the current control solution in which the flow valve sequentially undergoes the processes that: "a flow passes for the first time, the output flow makes a shifting mechanism return, a flow passes again, and the output flow makes the shifting mechanism return again" can comprise the following sequentially performed steps:

step S111a, the current output to the flow valve is increased at a first preset speed until a flow passes for the first time, and a current value when the flow passes for the first time is recorded as the maximum median current value of a high side; Step S112a, the current output to the flow valve is reduced at a second preset speed until the flow output by the flow valve makes the shifting mechanism return;

Step S113a, the current output to the flow valve is reduced at a third preset speed until a flow passes again, and a current value when the flow passes again is recorded as the maximum median current value of a low side; and Step S114a, the current output to the flow valve is increased at a fourth preset speed until the flow output by the flow valve makes the shifting mechanism return again.

Wherein, the first preset speed, the second preset speed, the third preset speed and the fourth preset speed may be set according to a control requirement.

Further, it is required to judge whether a flow passes through the flow valve in both step S111 and step S113. For this, two methods are provided in the embodiment of the present invention to judge whether the flow passes through the flow valve, and the methods are specifically as follows:

1) when a difference between the current position value and an initial median value of the shifting mechanism is greater than a first preset position threshold and the current position value of the shifting mechanism is greater than a second preset position threshold, it is judged that the flow passes through the flow valve.

2) When a movement speed of the shifting mechanism is greater than a preset speed threshold, it is judged that the flow passes through the flow valve.

When any one of the two methods may be implemented, it may be regarded that the flow passes through the flow valve, and the corresponding maximum median current value of the low side or the maximum median current value of the high side may be recorded at the moment so as to correct the corresponding median current value in the flow-current curve.

The teach-in process is described below with an example. Different data related to the example may be understood as each of the above-mentioned preset values (such as the first preset speed) according to the solution.

Figure 3:
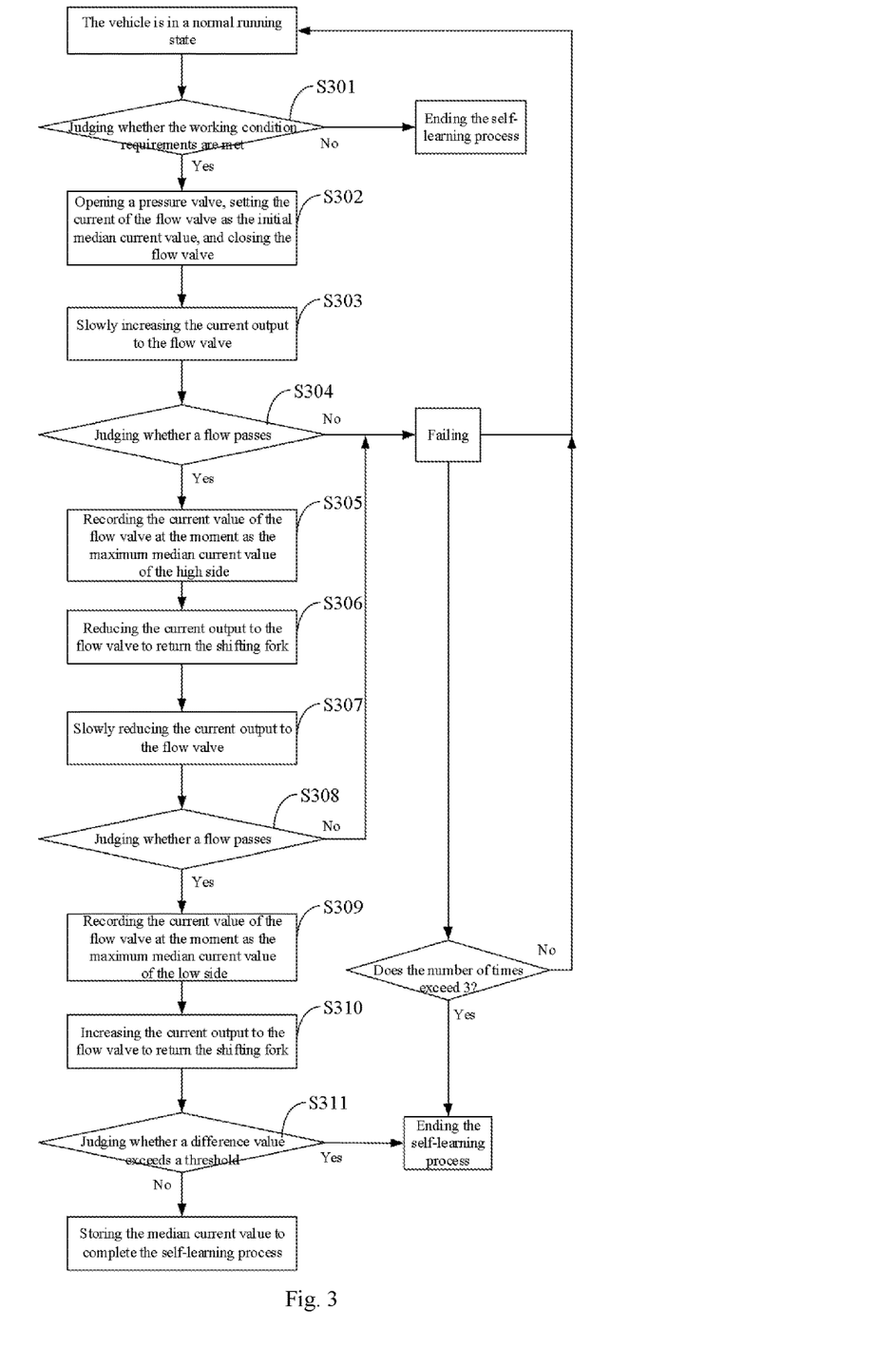
FIG. 3 is a flow diagram of an exemplary teach-in process in an embodiment of the present invention.

FIG. 3 is a flow diagram of an exemplary teach-in process in an embodiment of the present invention, and the shifting fork is used as the shifting mechanism in the example. As shown in FIG. 3, the teach-in process in the example mainly comprises the following steps:

step S301, whether the working condition requirements are met is judged when the vehicle is in a normal running state, if the working condition requirements are not met, the teach-in is ended, or else, step S302 is performed.

The working condition requirements also comprise a requirement on the shifting fork.

Step S302, a pressure valve is opened, the current of the flow valve is set as the initial median current value, and the flow valve is closed.

A current of the pressure valve may be firstly set so as to enable the pressure valve to be opened, then, at least 8 bar oil pressure is established in front of the flow valve, the oil pressure cannot fluctuate with a main oil pressure and can smoothly push the movement of the shifting fork under the action of an electromagnetic valve so as to be beneficial to the guarantee of the gear shifting smoothness.

The initial median current value at the moment may be the default median current value, and the flow valve is located on an absolute median, no flows passes, the shifting fork is located on a median, and the position of the shifting fork in such a state may be recorded as an initial median value of the shifting fork.

Step S303, the current output to the flow valve is slowly increased.

Step S304, whether a flow passes through the flow valve is judged, if no flows pass through the flow valve, teach-in is recorded to fail, and step S301 is returned, or else, step S305 is performed.

Step S305, the current value of the flow valve at the moment is recorded as the maximum median current value of the high side.

Specifically, for steps S303 to step 305, the current of the flow valve may be increased at the speed of 0.5 mA/10 ms until a flow passes, and if the shifting fork is disengaged from the median, the current value of the flow valve at the moment is regarded as the maximum median current value of the high side.

Step S306, the current output to the flow valve is reduced to return the shifting fork.

Specifically, in order to rapidly return the shifting fork to the median to learn the median current value of the low side, the current value may be reduced at the speed of 1 mA/10 ms so as to ensure that the shifting fork returns to the median again within the stipulated time.

Step S307, the current output to the flow valve is slowly reduced.

Step S308, whether a flow passes through the flow valve is judged, if no flows pass through the flow valve, teach-in is recorded to fail, and step S301 is returned, or else, step S309 is performed.

Step S309, the current value of the flow valve at the moment is recorded as the maximum median current value of the low side.

Specifically, for steps S307 to step 309, when the shifting fork returns to the median again, the current of the flow valve may be reduced at the speed of 0.5 mA/10 ms until a flow passes, and if the shifting fork is disengaged from the median, the current value of the flow valve at the moment is regarded as the maximum median current value of the low side.

Step S310, the current output to the flow valve is increased to return the shifting fork.

In order to rapidly return the shifting fork to the median, the current value is increased at the speed of 1 mA/10 ms so as to ensure that the shifting fork returns to the median again within the stipulated time.

Step S311, whether a difference value of the maximum median current value of the high side and the maximum median current value of the low side exceeds a threshold, if so, the teach-in is ended, or else, the maximum median current value of the high side and the maximum median current value of the low side exist, and one teach-in process is completed.

The judgment about whether a flow passes through the flow valve in steps S301-S311 may be performed based on the following exemplary conditions in combination with the description for the above-mentioned two judging methods:

1) a difference of an actual position value of the shifting fork to the initial median value of the shifting fork is greater than 0.6 mm, and the actual position value of the shifting fork is greater than 0.8 mm.

2) an actual movement speed of the shifting fork is greater than 12 mm/s.

It is regarded that a flow passes if any one of the two conditions is met, the current value at the moment is recorded as the corresponding maximum median current value of the high side or the maximum median current value of the low side, and in the example, the current value at the moment may be correspondingly recorded as a current value at 0.1 L/min in the flow-current curve of the flow valve.

Further, the ending of the teach-in process is mentioned in steps S301-S311 in the above-mentioned example, in more preferred embodiments, the teach-in process may be ended when any one of the following conditions is not met:

1) vehicle driving conditions are kept stable in the teach-in process.

2) the initial median value of the shifting mechanism does not exceed a third preset position threshold.

Wherein in the example, the third preset position threshold may be 1 mm (millimeter), for example.

3) before the flow passes through the flow valve, the time of increasing or reducing for a current of the flow valve does not exceed a first preset time threshold.

Wherein in the example, the first preset time threshold may be 4 s (second), for example.

4) the time of returning the shifting mechanism does not exceed a second preset time threshold. Wherein in the example, the second preset time threshold may be 1.2 s, for example.

5) a deviation between the maximum median current value of the high side and the maximum current value of the low side cannot exceed a preset current deviation threshold.

Wherein in the example, the preset current deviation threshold may be 200 mA (milliampere), for example.

Therefore, due to the setting of the above-mentioned conditions, the teach-in process may be controlled to be performed under an ideal environment, so that learning of result values with bigger errors are avoided.

In another preferred embodiment, the current control solution in which the flow valve sequentially undergoes the processes that: "a flow passes for the first time, the output flow makes a shifting mechanism return, a flow passes again, and the output flow makes the shifting mechanism return again" can by executed by acquiring the maximum median current value of a low side firstly, and then, acquiring the maximum median current value of a high side, namely the current control solution can comprise the following sequentially performed steps:

step S111b, the current output to the flow valve is reduced at a first preset speed until a flow passes for the first time, and a current value when the flow passes for the first time is recorded as the maximum median current value of the low side;

Step S112b, the current output to the flow valve is increased at a second preset speed until the flow output by the flow valve makes the shifting mechanism return;

Step S113b, the current output to the flow valve is increased at a third preset speed until a flow passes again, and a current value when the flow passes is recorded as the maximum median current value of the high side; and Step S114b, the current output to the flow valve is reduced at a fourth preset speed until the flow output by the flow valve makes the shifting mechanism return again.

It should be noted that implementation details of steps S111b-S114b can refer to the above-mentioned descriptions for steps S111a-S114a, the descriptions thereof are omitted herein.

Therefore, seen in combination with steps relevant to step S100, the variation of the hardware of the transmission may be adapted by continuous teach-in so as to obtain the deviation value generated by the median current value of the flow valve.

Step S200, correcting a flow-current curve of the flow valve based on the deviation value obtained by the teach-in process.

Preferably, in order to better guarantee the accuracy of data, a calibrated correction factor may be determined when the flow-current curve is corrected based on the deviation value, the deviation value is multiplied by the calibrated correction factor, then, the obtained product and the initial median current value are summated to obtain a sum value, and the median current value on the flow-current curve of the flow valve is corrected as the sum value. Namely the corrected median current value is equal to the sum of the initial median value and the product of the deviation value and the correction factor.

Wherein, the correction factor may be calibrated according to a vehicle driving cycle mode and the like.

Furthermore, after the corrected flow-current curve is obtained, the flow valve may be controlled based on the corrected flow-current curve to output a current corresponding to a target flow, so that the hydraulic oil filling effect as well as the gear shifting smoothness and time are guaranteed.

Based on the above, according to the flow valve control method provided by the embodiment of the present invention, a precise current-flow curve is obtained by continuously correcting the median current value of the flow valve based on the teach-in control strategy, the variation of the median current value, caused by the variation of the hardware, is avoided, and the flow valve control method is high in applicability and capable of achieving the aim of precisely controlling the flow valve, so that the hydraulic oil filling effect as well as the gear shifting smoothness and time may be guaranteed, and the service life of the whole gearbox of the transmission may be favorably prolonged.

Figure 4:
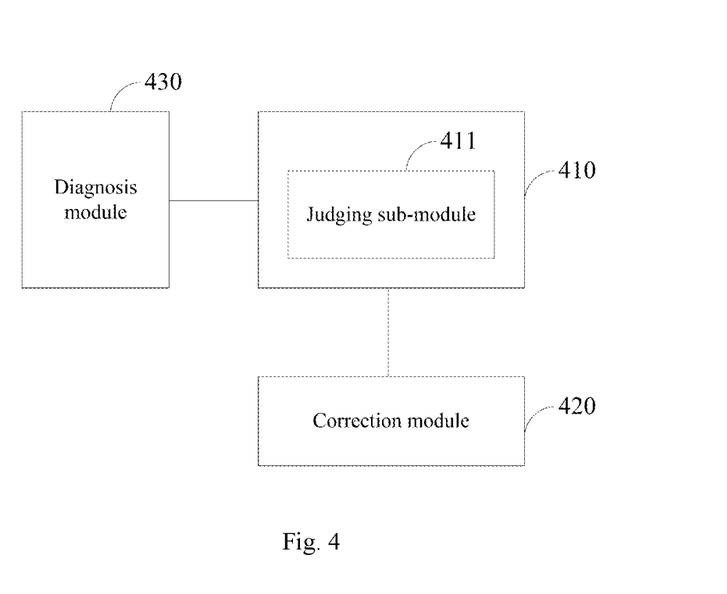
FIG. 4 is a structural example diagram of a flow valve control apparatus in an embodiment of the present invention.

Based on the same inventive concept, an embodiment of the present invention further provides a flow valve control apparatus. FIG. 4 is a structural example diagram of the flow valve control apparatus in the embodiment of the present invention. As shown in FIG. 4, the flow valve control apparatus can comprise:

the teach-in module 410, used for conducting a median current value teach-in of a flow valve starting from an initial median current value of the flow valve, wherein each process of teach-in comprises: a current output to the flow valve is controlled, so that the flow valve goes through the following processes successively: a flow passes for the first time, the output flow makes a shifting mechanism return, a flow passes again, and the output flow makes the shifting mechanism return again; recording current values when the flows pass through the flow valve twice as the maximum median current values; and acquiring a deviation value of each of the maximum median current values and the initial median current value; and the correction module 420, used for correcting a flow-current curve of the flow valve based on the deviation value.

Wherein, an initial median current value in a first teach-in process is an default median current value, and an initial median current value in a next teach-in process is a corresponding median current value of the flow valve in the flow-current curve obtained by correction in a previous teach-in process.

In a preferred description, the step that the teach-in module 410 controls the current output to the flow valve in the teach-in process comprises: the current output to the flow valve is increased at a first preset speed until a flow passes for the first time, and a current value when the flow passes for the first time is recorded as the maximum median current value of a high side; the current output to the flow valve is reduced at a second preset speed until the flow output by the flow valve makes the shifting mechanism return; the current output to the flow valve is reduced at a third preset speed until a flow passes again, and a current value when the flow passes again is recorded as the maximum median current value of a low side; and the current output to the flow valve is increased at a fourth preset speed until the flow output by the flow valve makes the shifting mechanism return again.

In another preferred description, the step that the teach-in module 410 controls the current output to the flow valve in the teach-in process comprises: the current output to the flow valve is reduced at a first preset speed until a flow passes for the first time, and a current value when the flow passes for the first time is recorded as the maximum median current value of the low side; the current output to the flow valve is increased at a second preset speed until the flow output by the flow valve makes the shifting mechanism return; the current output to the flow valve is increased at a third preset speed until a flow passes again, and a current value when the flow passes again is recorded as the maximum median current value of the high side; and the current output to the flow valve is reduced at a fourth preset speed until the flow output by the flow valve makes the shifting mechanism return again.

More preferably, the teach-in module 410 can comprise a judging sub-module 411 which is used for judging whether a flow passes through the flow valve by using following methods: when a difference between the current position value and an initial median value of the shifting mechanism is greater than the first preset position threshold and the current position value of the shifting mechanism is greater than the second preset position threshold, it is judged that the flow passes through the flow valve; and/or when a movement speed of the shifting mechanism is greater than a preset speed threshold, it is judged that the flow passes through the flow valve.

More preferably, the flow valve control apparatus of the transmission can further comprise a diagnosis module 430 which is used for diagnosing the following conditions in the teach-in process and ending the teach-in process when any one of the following conditions is not met: vehicle driving conditions are kept stable in the teach-in process; the initial median value of the shifting mechanism does not exceed the third preset position threshold; before the flow passes through the flow valve, the time for increasing or reducing for a current of the flow valve does not exceed a first preset time threshold; the time of returning the shifting mechanism does not exceed a second preset time threshold; and a deviation of the maximum median current value of the high side and the maximum current value of the low side cannot exceed a preset current deviation threshold.

Furthermore, the step that the correction module 420 is used for correcting the flow-current curve of the flow valve based on the deviation value can comprise: the deviation value is multiplied by a calibrated correction factor, then, the obtained product and the initial median current value are summated to obtain a sum value, and the median current value on the flow-current curve of the flow valve is corrected as the sum value.

It should be explained that the detailed description and beneficial effects of the flow valve control apparatus in the embodiment of the present invention can refer to the embodiment of the aforementioned flow valve control method, the descriptions thereof are omitted herein.

An embodiment of the present invention further provides a transmission control apparatus, and the transmission control apparatus is provided with the flow valve control apparatus of the transmission in the above-mentioned embodiment.

The transmission control apparatus may be a TCU (Transmission Control Unit), in this way, a flow valve control strategy in the embodiment of the present invention may be directly realized through the TCU, a control function of the TCU is enriched, and the service life of the TCU may be favorably prolonged.

It may be understood by the skill in the art that all or parts of the steps in the method in the above-mentioned embodiment may be completed through relevant hardware instructed by a program, the program is stored in one storage medium, and the program comprises a plurality of instructions for making a single chip microcomputer, a chip or a processor execute all or parts of the steps of the method in each of the embodiments of this application. The aforementioned storage medium comprises various media capable of storing program codes, such as a USB disk, a mobile hard disk, an ROM (Read-Only Memory), an RAM (Random Access Memory), a diskette or an optical disc.

The above descriptions are merely preferred descriptions of the present invention and are not intended to limit the present invention, and any modifications, equivalent substitutes, improvements and the like within the spirit and scope of the present invention should fall within the protective scope of the present invention.

The invention claimed is:

1. A flow valve control method, wherein the method comprising:
    conducting a median current value teach-in of a flow valve starting from an initial median current value of the flow valve, wherein each process of teach-in comprises:
    controlling a current output to the flow valve, so that the flow valve goes through the following processes successively: a flow passes for the first time, the output flow makes a shifting mechanism return, a flow passes again, and the output flow makes the shifting mechanism return again;
    recording current values when the flows pass through the flow valve twice as the maximum median current values; and
    acquiring a deviation value of each of the maximum median current values and the initial median current value; and
    correcting a flow-current curve of the flow valve based on the deviation value,
    wherein an initial median current value in a first teach-in process is an default median current value, and an initial median current value in a next teach-in process is a corresponding median current value of the flow valve in the flow-current curve obtained by correction in a previous teach-in process.

2. The flow valve control method according to claim 1, wherein the step of controlling a current output to the flow valve comprises:
    increasing the current output to the flow valve at a first preset speed until a flow passes for the first time, and recording a current value when the flow passes for the first time as the maximum median current value of a high side;
    reducing the current output to the flow valve at a second preset speed until the flow output by the flow valve makes the shifting mechanism return;
    reducing the current output to the flow valve at a third preset speed until a flow passes again, and recording a current value when the flow passes again as the maximum median current value of a low side; and
    increasing the current output to the flow valve at a fourth preset speed until the flow output by the flow valve makes the shifting mechanism return again.

3. The flow valve control method according to claim 2, wherein whether a flow passes through the flow valve is judged by using following methods:
    judging that the flow passes through the flow valve when a difference between the current position value and an initial median value of the shifting mechanism is greater than a first preset position threshold and the current position value of the shifting mechanism is greater than a second preset position threshold; and/or
    judging that the flow passes through the flow valve when a movement speed of the shifting mechanism is greater than a preset speed threshold.

4. The flow valve control method according to claim 2, wherein the method further comprising:
    ending the teach-in process when any one of the following conditions is not met:

vehicle driving conditions are kept stable in the teach-in process;

the initial median value of the shifting mechanism does not exceed a third preset position threshold;

before the flow passes through the flow valve, the time of increasing or reducing for a current of the flow valve does not exceed a first preset time threshold;

the time of returning the shifting mechanism does not exceed a second preset time threshold; and a deviation between the maximum median current value of the high side and the maximum current value of the low side cannot exceed a preset current deviation threshold.

5. The flow valve control method according to claim 1, wherein the step of controlling a current output to the flow valve comprises:

reducing the current output to the flow valve at a first preset speed until a flow passes for the first time, and recording a current value when the flow passes for the first time as the maximum median current value of the low side;

increasing the current output to the flow valve at a second preset speed until the flow output by the flow valve makes the shifting mechanism return;

increasing the current output to the flow valve at a third preset speed until a flow passes again, and recording a current value when the flow passes again as the maximum median current value of the high side; and reducing the current output to the flow valve at a fourth preset speed until the flow output by the flow valve makes the shifting mechanism return again.

6. The flow valve control method according to claim 5, wherein whether a flow passes through the flow valve is judged by using following methods:

judging that the flow passes through the flow valve when a difference between the current position value and an initial median value of the shifting mechanism is greater than a first preset position threshold and the current position value of the shifting mechanism is greater than a second preset position threshold; and/or judging that the flow passes through the flow valve when a movement speed of the shifting mechanism is greater than a preset speed threshold.

7. The flow valve control method according to claim 5, wherein the method further comprising:

ending the teach-in process when any one of the following conditions is not met:

vehicle driving conditions are kept stable in the teach-in process;

the initial median value of the shifting mechanism does not exceed a third preset position threshold;

before the flow passes through the flow valve, the time of increasing or reducing for a current of the flow valve does not exceed a first preset time threshold;

the time of returning the shifting mechanism does not exceed a second preset time threshold; and a deviation between the maximum median current value of the high side and the maximum current value of the low side cannot exceed a preset current deviation threshold.

8. A computer readable storage medium, storing a computer program, wherein the program implements the flow valve control method according to claim 1 when being executed by a processor.

9. A flow valve control apparatus, wherein comprising:

a teach-in module, used for conducting a median current value teach-in of a flow valve starting from an initial median current value of the flow valve, wherein each process of teach-in comprises:

controlling a current output to the flow valve, so that the flow valve goes through the following processes successively: a flow passes for the first time, the output flow makes a shifting mechanism return, a flow passes again, and the output flow makes the shifting mechanism return again;

recording current values when the flows pass through the flow valve twice as the maximum median current values; and acquiring a deviation value of each of the maximum median current values and the initial median current value; and a correction module, used for correcting a flow-current curve of the flow valve based on the deviation value, wherein an initial median current value in the first teach-in process is an default median current value, and an initial median current value in a next teach-in process is a corresponding median current value of the flow valve in the flow-current curve obtained by correction in a previous teach-in process.

10. The flow valve control apparatus according to claim 9, wherein the teach-in module is used for controlling a current output to the flow valve in the teach-in process comprises:

increasing the current output to the flow valve at a first preset speed until a flow passes for the first time, and recording a current value when the flow passes for the first time as the maximum median current value of a high side;

reducing the current output to the flow valve at a second preset speed until the flow output by the flow valve makes the shifting mechanism return;

reducing the current output to the flow valve at a third preset speed until a flow passes again, and recording a current value when the flow passes again as the maximum median current value of a low side; and increasing the current output to the flow valve at a fourth preset speed until the flow output by the flow valve makes the shifting mechanism return again.

11. The flow valve control apparatus according to claim 10, wherein the teach-in module comprises a judging sub-module which is used for judging whether a flow passes through the flow valve by using following methods:

judging that the flow passes through the flow valve when a difference between the current position value and an initial median value of the shifting mechanism is greater than a first preset position threshold and the current position value of the shifting mechanism is greater than a second preset position threshold;

and/or judging that the flow passes through the flow valve when a movement speed of the shifting mechanism is greater than a preset speed threshold.

12. The flow valve control apparatus according to claim 10, wherein the apparatus further comprising a diagnosis module which is used for diagnosing the following conditions in the teach-in process and ending the teach-in process when any one of the following conditions is not met:

vehicle driving conditions are kept stable in the teach-in process;

the initial median value of the shifting mechanism does not exceed a third preset position threshold;

before the flow passes through the flow valve, the time of increasing or reducing for a current of the flow valve does not exceed a first preset time threshold;

the time of returning the shifting mechanism does not exceed a second preset time threshold; and a deviation between the maximum median current value of the high side and the maximum current value of the low side cannot exceed a preset current deviation threshold.

13. The flow valve control apparatus according to claim 9, wherein the teach-in module is used for controlling a current output to the flow valve in the teach-in process comprises:
   reducing the current output to the flow valve at a first preset speed until a flow passes for the first time, and recording a current value when the flow passes for the first time as the maximum median current value of the low side;
   increasing the current output to the flow valve at a second preset speed until the flow output by the flow valve makes the shifting mechanism return;
   increasing the current output to the flow valve at a third preset speed until a flow passes again, and recording a current value when the flow passes again as the maximum median current value of the high side; and
   reducing the current output to the flow valve at a fourth preset speed until the flow output by the flow valve makes the shifting mechanism return again.

14. The flow valve control apparatus according to claim 13, wherein the teach-in module comprises a judging sub-module which is used for judging whether a flow passes through the flow valve by using following methods:
   judging that the flow passes through the flow valve when a difference between the current position value and an initial median value of the shifting mechanism is greater than a first preset position threshold and the current position value of the shifting mechanism is greater than a second preset position threshold; and/or
   judging that the flow passes through the flow valve when a movement speed of the shifting mechanism is greater than a preset speed threshold.

15. The flow valve control apparatus according to claim 13, wherein the apparatus further comprising a diagnosis module which is used for diagnosing the following conditions in the teach-in process and ending the teach-in process when any one of the following conditions is not met:
   vehicle driving conditions are kept stable in the teach-in process;
   the initial median value of the shifting mechanism does not exceed a third preset position threshold;
   before the flow passes through the flow valve, the time of increasing or reducing for a current of the flow valve does not exceed a first preset time threshold;
   the time of returning the shifting mechanism does not exceed a second preset time threshold; and
   a deviation between the maximum median current value of the high side and the maximum current value of the low side cannot exceed a preset current deviation threshold.

* * * * *